Dec. 27, 1927.
J. C. STRAUB
1,653,884
PACKING JOINT
Filed Dec. 15, 1925
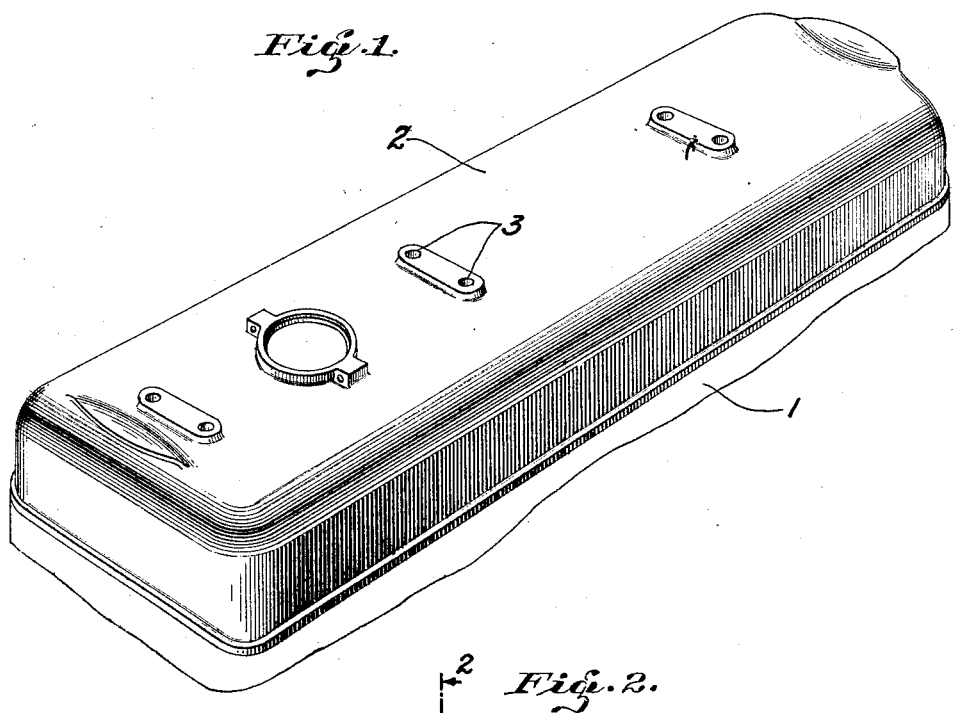
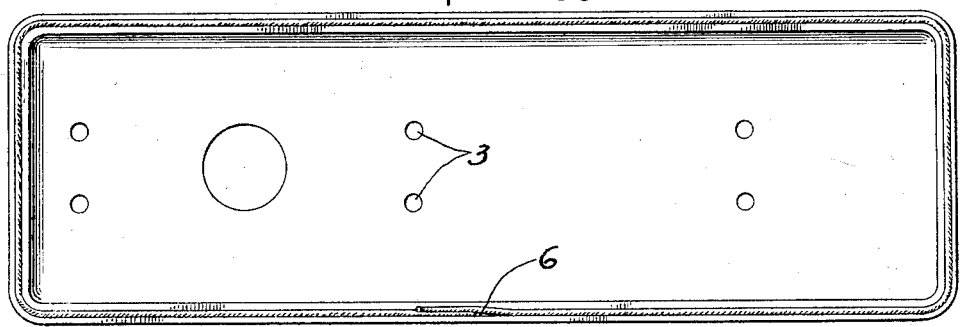
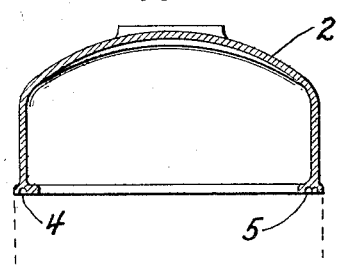 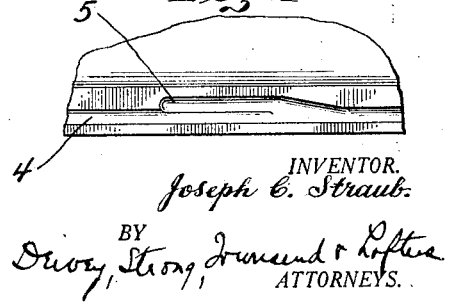
INVENTOR.
Joseph C. Straub.
BY
ATTORNEYS.

Patented Dec. 27, 1927.

1,653,884

UNITED STATES PATENT OFFICE.

JOSEPH C. STRAUB, OF BERKELEY, CALIFORNIA, ASSIGNOR TO HALL-SCOTT MOTOR CAR CO., A CORPORATION.

PACKING JOINT.

Application filed December 15, 1925. Serial No. 75,488.

This invention relates to packing joints and particularly to an improved packing joint wherein the ends of a packing strip are placed in overlapping relation to prevent leakage thereby, often caused by contraction and expansion. Such joints have been heretofore formed by a groove in the face of the element to be packed and laying a packing strip therein in a manner bringing the ends of the strip into end to end relation. If such element has a high coefficient of expansion and becomes heated, the same will expand in a manner leaving a leaking gap between the ends of the packing. It is the primary object of my invention to provide an improved packing joint wherein such a condition cannot occur.

It is a further object of my invention to provide an improved housing box for use with internal combustion engines or the like, which box has my improved packing joint incorporated therein.

In the accompanying drawing I have illustrated one specific embodiment of my invention, but it will be understood that the invention can be otherwise embodied and that the drawing is not to be construed as defining or limiting the scope of the invention, the claim appended to this specification being relied upon for that purpose.

In the drawing:—

Figure 1 is a perspective view of my improved housing box used as a cover for the valve tappets and other mechanism on the top of an internal combustion engine.

Figure 2 is a bottom plan view of the housing.

Figure 3 is a cross sectional view thereof on line 3—3 of Figure 2.

Figure 4 is an enlarged fragmentary view of the overlapping packing groove in the housing.

Referring more specifically to the drawings by reference characters, 1 indicates an engine block and 2 the cover mounted on the top thereof. The cover is held to the block by screws extending through holes 3. I preferably make this cover of aluminum.

The purpose of the cover, as illustrated in the drawings, is to provide a leak-proof splash housing for the valve tappets and other mechanism on top of the engine block 1, although it will be understood that the invention is not to be construed as so limited. I provide a groove 4 in the open face edge of the housing surrounding such open face. A branch groove is provided at 5, which overlaps the main groove whereby the ends of the packing strip 6 in the groove are placed in overlapping relation. In this manner the packing entirely surrounds the housing chamber even when the housing expands considerably due to the engine heat, such expansion being greater in a housing made of aluminum, which metal has a high coefficient of expansion. It will be seen that by the use of my invention a secure and non-leak packing is provided in a construction of the type illustrated.

Having thus described my invention, what I claim is:

A housing member having a continuous rim to cooperate with a surface and form a joint therewith, said rim being formed with a shallow groove throughout, said groove having a lateral branch extending to one side of the main groove and overlapping the latter for a short distance, and a gasket arranged in said groove and extending throughout the length thereof and into the branch portion, said gasket being adapted to engage the cooperating surface and to be compressed throughout its length when the parts are clamped together, so as to form a packing joint without interruption.

JOSEPH C. STRAUB.